3,281,518
THERMOCOUPLE ASSEMBLY
Roger C. Stroud, Lafayette Hill, and Harry J. Hesson, Philadelphia, Pa., assignors to Leeds and Northrup Company, Philadelphia, Pa., a corporation of Pennsylvania
Filed Nov. 26, 1963, Ser. No. 326,185
7 Claims. (Cl. 73—359)

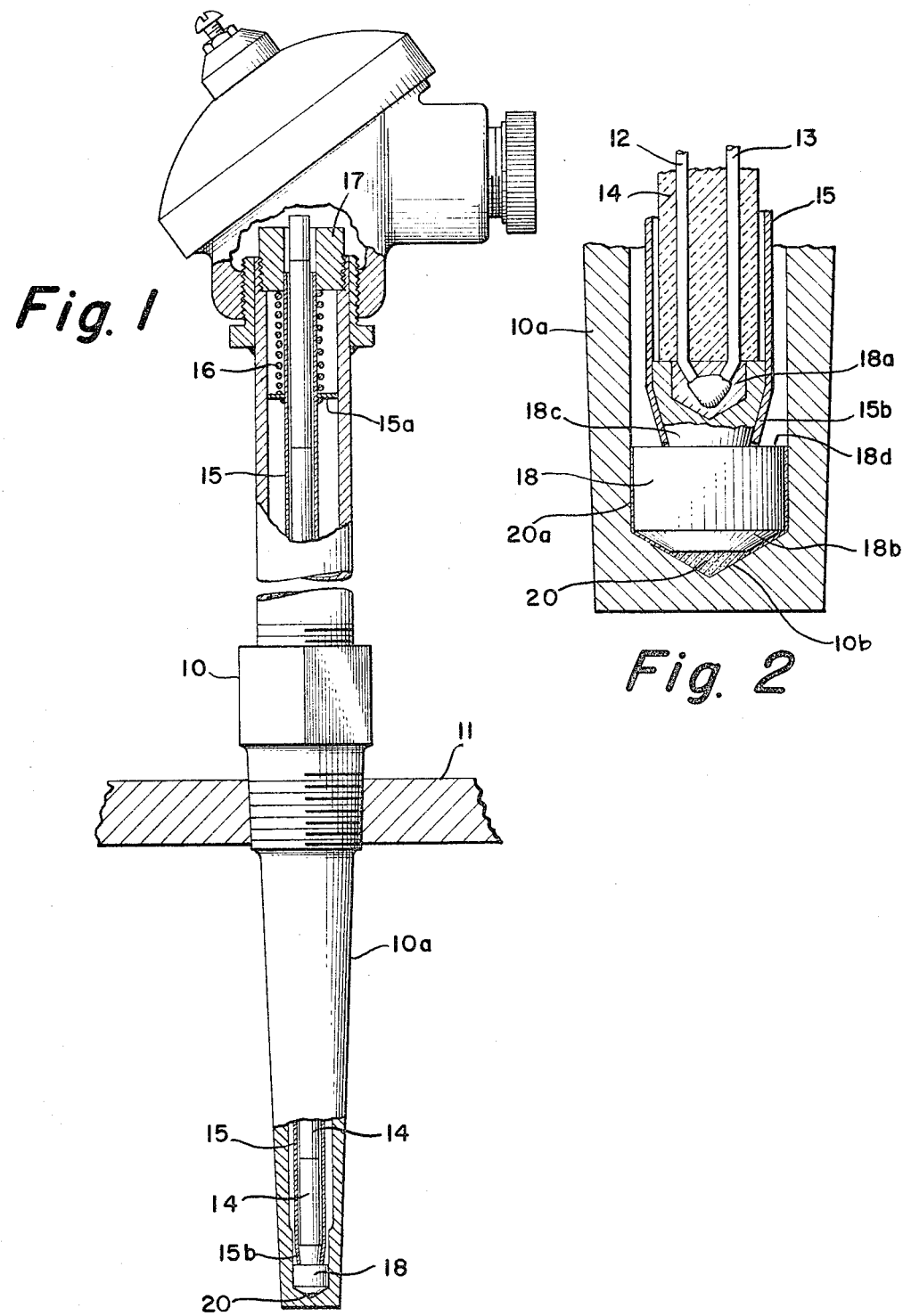

This invention relates to high speed thermocouples of the type utilized in thermocouple wells for the measurement of temperature of a medium surrounding the well.

In many applications, more particularly in high pressure piping for steam or water, the temperature of the medium, steam or water, is measured by means of suitable thermocouple elements. In order to prevent the possibility of leakage, a thermocouple well is inserted into the pipe, and the thermocouple element is placed within the well. In the past there has been secured to the end of the thermocouple element a pellet of high thermal conductivity material which is firmly seated against the well to increase the thermal contact and the speed of response. Though these arrangements have been used for many years, they leave much to be desired in attaining the maximum speed of response of the thermocouple.

In carrying out the present invention in one form, it has been found that the speed of response may be surprisingly increased by disposing within the thermocouple well a quantity of fine powder consisting of a metal of high thermal conductivity, such as silver, aluminum, or copper. It is desirable that the powdered metal provide a bed at the bottom of the well sufficient to assure the formation of a heat-transfer path of substantial area between the well and the pellet attached to the thermocouple element. When this is done, the speed of response will be surprisingly increased.

For further objects and advantages of the invention and for a more detailed understanding thereof, reference is to be had to the following description, taken in conjunction with the accompanying drawing, in which:

FIG. 1 is a sectional view of a thermocouple assembly embodying the invention; and FIG. 2 is an enlarged sectional view of the lower end of the assembly of FIG. 1.

Referring to FIG. 1, a thermocouple well 10 is shown threaded into an opening in a pipe, only the upper wall 11 of which has been shown. This wall 11 may be that of a vessel or any type of equipment in which it is desired to prevent egress of any of the materials outwardly of the wall. Thermocouple wells are widely used for the measurement of temperature of materials within high pressure piping where the piping may carry steam, water, petroleum, and the like. Since the well 10 has a protruding end portion 10a disposed within the vessel or pipe, that end portion must have a wall thickness adequate to withstand the pressure. Frequently, the wells will be fabricated from solid stock. They may be of carbon steel or stainless steel, it being understood that those skilled in the art will know how to select the materials for and thickness of the well. Disposed within the well is a thermocouple element, FIG. 2, comprised of thermocouple wires 12 and 13. These wires will be of dissimilar materials selected for the temperature to be measured. For example, for a temperature of from 400° F. to 1200° F. the wire 12 may be of iron, and the wire 13 of constantan. The wires extend through and are insulated from the well itself by an assembly which includes a series of insulating elements 14 carried within a tubular metal member 15. There extends outwardly from the tubular member 15 a flange 15a against which the lower end of a spring 16 bears. The upper end of the spring bears against a threaded nut or plug 17 which is sufficiently long in its threaded portion to compress the spring 16 and thus to press downwardly the thermocouple assembly. The ends of the thermocouple wires 12 and 13 are preferably welded together at their lower ends.

In welding together the small wires as by an electric arc a small metallic bead is formed which will be of random size and shape. Accordingly, it is ground to a size and shape to be received in an opening 18a of a pellet 18. The opening 18a is filled with brazing compound and the temperature elevated to braze the welded bead to the pellet 18. This not only secures it to the pellet but forms a good heat-conducting path therewith. Preferably, the brazing compound is a silver alloy and thus the brazing may be considered as equivalent to silver soldering.

The pellet 18 is preferably made of silver though for some applications it may be made of aluminum or copper, the reference to silver, aluminum, and copper being intended to include their alloys as well. These materials have been referred to as representative of a class of high thermal-conductivity powdered materials satisfactory for the purposes of the present invention.

The pellet 18 is provided with an enlarged head with tapered lower faces 18b generally complementary to corresponding tapered faces 10b of the bottom of the thermocouple well. The upper portion of the pellet 18 of lesser cross section has a tapered conical surface 18c to receive the lower end 15b of tube 15. Thus as shown in FIG. 1, the lower end 15b is spun over the region of smaller cross section to secure the pellet 18 to the tube 15, the lower end of that tube terminating adjacent the upper flat surface 18d of pellet 18.

The present invention is characterized by the fact that there is included within the well 10 a quantity 20 of a fine powder consisting of a material or metal of high thermal conductivity. This mass of fine powder 20 forms a transfer path of substantial area between the inner wall of the well and the pellet 18. The fine powdered metal may be of the same material as the pellet, i.e., it may consist of silver powder, aluminum powder, copper powder, or mixtures of the same including their several alloys. As for fineness, it is preferred that the powder will pass through a screen of 325 mesh.

By utilizing a very fine metal powder, that powder fills in the space 20a circumferentially of the cylindrical side portion of the pellet and the cylindrical inner wall of the well 10a. Thus, the metal powder forms a high heat-conductive path coextensive with the cylindrical sides of the pellet 18, with its tapered surface 18b, and with its bottom surface.

The distribution of the finely divided metal is accomplished in the following manner. There is deposited in the well 10 a small quantity of the powder. In one embodiment of the invention only about 2/100 of a gram of silver powder was utilized, it being understood that the silver powder passing through a screen of 325 mesh is of impalpable character. By reason of the dimensioning of the pellet 18 closely to fit within the lower end of the well 10a, this very small amount of powder will be adequate to form the semi-solid conductive areas already described. The fineness of the powder assures its distribution about the pellet 18 which is accomplished by simply inserting the pellet into the well with the powder at the lower end. As the pellet is pressed downwardly by the spring 16, by tightening of nut 17, the silver powder is displaced. It flows from the bottom of the well upwardly along the side walls and fills all spaces between the pellet and the inner wall of the well in the vicinity of the powder. There is attained an extraordinarily effective uniform distribution of the powder by the simple technique just described, thus contributing to the unexpected decrease in the response time of the thermocouple assembly.

In an arrangement similar to the one just described, but without the silver powder, the thermocouple assembly was immersed in an ice bath and after adequate time for it to respond to the temperature, it was transferred to a water bath at a temperature of 50° C. It required some 39 seconds for the total temperature change to take place. The foregoing experiment was then repeated with the mass of silver powder disposed within the well to provide the improved heat transfer path. The same total temperature change, indicated by the thermocouple, then took place in 14 seconds.

In the past it has sometimes been the practice during manufacture of thermocouple units to attempt to obtain more intimate contact between the metal pellet and the well by using a special tube having internal and external diameters like those of tube 15 and deforming the metal pellet into more intimate contact with the tube by the application of pressure thereto. As a result, the metallic pellet on the end of the thermocouple elements sometimes adheres to the walls of the well thus making difficult withdrawal of the thermocouple without destruction of the thermocouple assembly or probe, as well as creating the problem of removal of the pellet itself where it did not move outwardly with the internal assembly.

In accordance with the present invention the conical surface 18c with the spun-over end 15b of the tube 15 provides a strong mechanical connection by means of which the pellet 18 and its associated thermocouple may be removed from the well 10 for inspection and replacement.

The present invention is particularly characterized by the fact that the fine metallic powder is of small size, i.e., much smaller than that which will pass through a screen of 200 mesh and preferably smaller than that, i.e., passing through a screen of 325 mesh. By reason of the small size of the particles, the surface area per unit volume is greatly increased over that where larger particles are utilized and of an entirely different order than that which may be attained by the use of steel wool. Moreover, the combination of the piston-like action formed by the pellet against the fine powder not only assures uniform distribution but it also compacts it to secure the advantages of an enhanced area of a semi-solid mass. In the case of silver powder, there is attained at room temperature a union of the particles at least analogous to sintering, and in the case of aluminum powder and copper powder, the compressive pressures greatly enhance the thermal conductivity of the path through them, though not to as great a degree as with silver powder. In addition, silver is a better heat conductor than aluminum or copper and the sintering effect thereof, referred to above, is increased during the time it is exposed to high temperatures.

Though the spacing between the pellet 18 and the adjacent side wall of the well 10 is adequate for clearance purposes, the powder is retained beneath the pellet by reason of the compressive forces which cause the surfaces to adhere together, this compressive force having, of course, components which aid in retaining the silver powder beneath and around the pellet.

It is understood that variations in the invention may be made, it being intended by the appended claims to cover all equivalent modifications.

What is claimed is:

1. A fast-acting temperature responsive assembly comprising:
   a well having a closed end of the type for disposition in heat transfer relation with a medium the temperature of which is to be measured,
   a probe having temperature responsive means therein and an end portion thereon disposed in substantial mating relationship with and of configuration complementary to a corresponding portion of the closed end of said well,
   a mass of fine powder consisting of a metal of high thermal conductivity forming a relatively thin boundary layer between said end portion of said probe and said corresponding portion of said well to increase the area of thermally conductive surface contact and rate of heat transfer by accommodating for any irregularities therebetween, and
   means for maintaining compressive forces between said end portion of said probe and said corresponding portion of said well to correspondingly compress said mass of fine powder to uniformly distribute the powder between the end portion of the probe and the corresponding portion of the well as well as to enhance the thermal conductivity thereof.

2. The temperature responsive assembly of claim 1 in which said mass of fine powder consists of powder, all of which will pass through a screen of 200 mesh and above.

3. A fast-acting thermocouple assembly comprising:
   a thermocouple well of the closed end type for deposition in heat transfer relation with a medium the temperature of which is to be measured,
   a probe having temperature responsive means therein disposed within said thermocouple well,
   said probe having a conical end portion and a cylindrical portion extending from said conical end portion of configuration complementary with the interior of the closed end of the thermocouple well, and
   a mass of fine powder consisting of a metal of high thermal conductivity uniformily distributed about said conical end portion and said cylindrical portion of said probe and filling the space between the probe and the complementary surfaces of the closed end of the thermocouple well to increase the area of thermally conductive surface contact therebetween and thus increase the rate of heat transfer between the thermocouple well and the probe.

4. The thermocouple assembly of claim 3 in which said mass of fine powder consists of silver powder all of which will pass through a screen of about 200 mesh and above.

5. A fast-acting thermocouple assembly comprising:
   a thermocouple well of the closed-end type for disposition in heat transfer relation with a medium the temperature of which is to be measured,
   a probe having temperature responsive means therein disposed within said well,
   said probe including at one end thereof a pellet of high thermal conductivity material to which said temperature responsive means is secured,
   said pellet having an enlarged end portion and an intermediate tapered portion with the larger cross-sectional area spaced from the end portion,
   a tubular member surrounding said temperature responsive means, the lower end of which engages said tapered portion of said pellet to form a mechanical connection therewith, and
   a mass of fine powder consisting of a metal of high thermal conductivity uniformly distributed between said pellet and said thermocouple well to form a heat transfer path of substantial area between said well and said pellet for rapid response of said temperature responsive means to the temperature of said medium.

6. A fast-acting thermocouple assembly, comprising:
   a thermocouple well of the closed end type for disposition in heat-transfer relation with a medium the temperature of which is to be measured,
   thermocouple wires disposed within said well, said wires at one end being welded together to form a thermocouple,
   a pellet of high thermal conductivity material to which said thermocouple wires are secured in intimate physical contact therewith, said pellet having a conical end portion complementary to a conical end surface of said well, said pellet also having a cylindrical portion from which said conical end portion extends, a mass of fine powder consisting of a metal of high thermal conductivity uniformly distributed about said cylindrical surface and said conical surface and filling the gap between it and the complementary surfaces of said well, thus forming a heat-transfer path of substantial area between said well and said pellet for rapid response of said thermocouple to said temperature of said medium, and means for applying pressure to said pellet to place said mass of powder under compression between the lower end of said pellet and the bottom surface of said well to uniformly distribute said mass of fine powder between said pellet and said thermocouple well and increase the thermal conductivity thereof.

7. A fast-acting thermocouple assembly, comprising:

a thermocouple well of the closed-end type for disposition in heat-transfer relation with a medium the temperature of which is to be measured, thermocouple wires disposed within said well, said wires at one end being welded together to form a thermocouple, a pellet of high thermal conductivity material to which said thermocouple wires are secured in intimate physical contact therewith, said pellet being provided with an enlarged end portion and an intermediate tapered portion with the larger cross-sectional area spaced from the end portion, a tubular member surrounding said thermocouple wires the lower end of which is spun into said tapered portion thereby to form a strong mechanical connection for withdrawal of said pellet from said thermocouple well and for inserting the same into said well, a mass of fine powder consisting of a metal of high thermal conductivity within said well forming a heat-transfer path of substantial area between said well and said pellet for rapid response of said thermocouple to said temperature of said medium, and means for applying pressure to said pellet to place said mass of powder under compression between the lower end of said pellet and the bottom surface of said well to uniformly distribute said mass of fine powder between said pellet and said thermocouple well and increase the thermal conductivity thereof.

References Cited by the Examiner
UNITED STATES PATENTS

| | | | |
|---|---|---|---|
| 2,012,112 | 8/1935 | States | 73—359 X |
| 2,371,288 | 3/1945 | Frownfetter | 136—4 |
| 3,061,806 | 10/1962 | Stevens | 338—28 |
| 3,086,075 | 4/1963 | Gard | 174—152 |
| 3,147,457 | 9/1964 | Gill et al. | 338—28 |
| 3,188,866 | 6/1965 | Mayer | 73—359 |

LOUIS R. PRINCE, *Primary Examiner.*

D. M. YASICH, *Assistant Examiner.*